United States Patent
Zeng et al.

(10) Patent No.: US 10,116,013 B1
(45) Date of Patent: Oct. 30, 2018

(54) ELECTRONIC TRANSPORT-RESISTANT BATTERY LAYER

(71) Applicant: Apple Inc., Cupertino, CA (US)

(72) Inventors: Qingcheng Zeng, Cupertino, CA (US); Donald G. Dafoe, San Jose, CA (US); Andrew Chu, Cupertino, CA (US); Junwei Jiang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 15/087,750

(22) Filed: Mar. 31, 2016

Related U.S. Application Data

(60) Provisional application No. 62/141,504, filed on Apr. 1, 2015.

(51) Int. Cl.
*H02J 7/00* (2006.01)
*H01M 10/44* (2006.01)
*H01M 10/0525* (2010.01)
*H01M 10/058* (2010.01)
*H01M 10/42* (2006.01)

(52) U.S. Cl.
CPC ....... *H01M 10/443* (2013.01); *H01M 10/058* (2013.01); *H01M 10/0525* (2013.01); *H01M 10/4235* (2013.01); *H02J 7/0029* (2013.01); *H01M 2220/30* (2013.01)

(58) Field of Classification Search
CPC .................................................. H02J 7/0029
USPC .......................................................... 320/162
See application file for complete search history.

(56) References Cited

U.S. PATENT DOCUMENTS

| | | | | |
|---|---|---|---|---|
| 5,558,957 A | * | 9/1996 | Datta | G06K 19/0702 29/623.4 |
| 7,070,632 B1 | * | 7/2006 | Visco | H01M 2/1686 29/623.3 |
| 2003/0099884 A1 | * | 5/2003 | Chiang | G02F 1/1523 429/233 |

(Continued)

OTHER PUBLICATIONS

Junichi Nishimura, et al., "Developmment of New Aluminum-Celmet Current Collector That Contributes to the Improvement of Various Properties of Energy Storage Devices", SEI Technical Review, No. 76, Apr. 2013, pp. 40-44.

(Continued)

*Primary Examiner* — Suchin Parihar
(74) *Attorney, Agent, or Firm* — Robert C. Kowert; Meyertons, Hood, Kivlin, Kowert & Goetzel, P.C.

(57) ABSTRACT

A battery includes one or more protection layers, applied to one or more foil layers in the battery, which restrict electronic transport across the protection layer based on exposure to particular physical conditions. The protection layer can change from being an electrically conductive layer to being an electrically insulating layer based on the exposure. The protection layer can include a mixture of materials that change state to electrically insulating states based on exposure to various particular physical conditions. A battery can include multiple protection layers that restrict electronic transport based on exposure to different physical conditions. A protection layer applied to a foil layer that is applied to an electrode restricts electronic transport between the foil layer and the electrode based on exposure to the one or more physical conditions. A protection layer located between separate battery cells can restrict electronic transport between portions of separate battery cells.

20 Claims, 9 Drawing Sheets

(56) References Cited

U.S. PATENT DOCUMENTS

2011/0076550 A1* 3/2011 Liang .................. H01M 2/0202
                                                    429/175
2016/0149196 A1* 5/2016 Fan ........................ H01M 2/34
                                                     429/50
2017/0214095 A1* 7/2017 Mukherjee ............ H01M 10/36

OTHER PUBLICATIONS

Targray, "Anode Copper and Nickel Foils", Retrieved from URL: http://www.targray.com/li-ion-battery/cathode-materials/foils [Mar. 25, 2015 5:01:20 PM], pp. 1-4.

Theodore Gray, "Extracting lithium foil from a battery", Retrieved from URL: http://theodoregray.com/periodictable/Stories/003.2/index.html [Mar. 25, 2015 5:00:38 PM], pp. 1-3.

* cited by examiner

ELECTRONIC TRANSPORT-RESISTANT BATTERY LAYER

This application claims priority from U.S. Provisional Application No. 62/141,504, entitled "Electronic Transport-Resistant Battery Layer" and filed Apr. 1, 2015, the contents of which is incorporated by reference in its entirety herein.

BACKGROUND

Technical Field

The disclosed embodiments relate to lithium batteries configured to provide electrical power support to at least some portion of one or more portable electronic devices. More specifically, the disclosed embodiments relate to at least partially suppressing electronic or ionic transport through a lithium battery.

Description of the Related Art

Rechargeable batteries are presently used to provide power to a wide variety of portable electronic devices, including laptop computers, cell phones, PDAs, digital music players and cordless power tools. As these electronic devices become increasingly smaller and more powerful, the batteries that are used to power these devices need to store more energy in a smaller volume.

The most commonly used type of rechargeable battery is a lithium battery, which can include a lithium-ion or a lithium-polymer battery. Lithium-ion and lithium-polymer batteries typically contain a cathode current collector; a cathode comprised of an active material, a separator, an anode current collector; and an anode comprised of an active material. The cathode can comprise a cathode coating, and the anode can comprise an anode coating.

Some batteries, including lithium batteries, can include a current collector, which includes a terminal and a "foil" material that at least partially covers one or more surfaces of one or more electrodes. Such a material, referred to herein as simply a "foil layer", provides a more uniform pathway of electronic transport between an electrode and the terminal.

A lithium battery can, conventionally, include an anode that is comprised of a suitable anode material such as a graphite material and a cathode that is comprised of a lithium salt material. Some lithium batteries include an anode that comprises a lithium metal material. A lithium battery that includes a lithium metal anode can be configured to have substantially increased energy capacity, relative to a lithium battery of similar size that includes a graphite anode.

In some cases, one or more components of a lithium battery can be exposed to extreme conditions that can adversely affect performance of the battery. Such extreme conditions can include a temperature of the component exceeding one or more safe limits, a voltage at the component exceeding one or more safe limits, etc. Where a component experiences conditions that exceed one or more safe limits associated with the components, the lithium battery as a whole, some combination thereof, etc., the battery can experience a partial or complete failure of the one or more components. Such failures can include an electrical short of the battery. Such an electrical short can result in failure of the battery and can further impose a safety risk due to overheating of the battery due to the short, which can further lead to a fire. In some cases an electrical short can result in one or more components of the battery experiencing one or more conditions that exceed one or more safe limits of the one or more components.

SUMMARY OF EMBODIMENTS

Some embodiments include an apparatus that further includes a battery cell that is configured to at least partially restrict electronic transport through the battery cell based on exposure to one or more particular physical conditions. The battery cell comprises a foil layer that couples an electrode in the battery cell to an electrical terminal and a protection layer, located between the foil layer and the electrode, which is configured to change from being electrically conductive to being electrically insulating based on exposure of the protection layer to the one or more particular physical conditions.

Some embodiments include a method that includes at least partially fabricating a battery that is configured to at least partially restrict electronic transport through the battery cell based on exposure to one or more particular physical conditions. The at least partial fabrication includes applying a protection layer to a foil layer that is configured to be applied to an electrode comprising the battery cell, wherein the protection layer is configured to restrict electronic transport between the foil layer and the electrode based on exposure of the protection layer to the one or more particular physical conditions.

Some embodiments include a portable electronic device that itself includes at least one protection component that is configured to consume electrical power and a battery that is configured to provide electrical power support to the at least one protection component. The battery is configured to at least partially shut down based on at least partial exposure to one or more particular physical conditions. To at least partially shut down based on at least partial exposure to one or more physical conditions, the battery comprises one or more protection layers, located between two or more portions of the battery, which is configured to restrict electronic transport between the two or more portions of the battery based on exposure of the protection layer to the one or more particular physical conditions.

Figure 1:
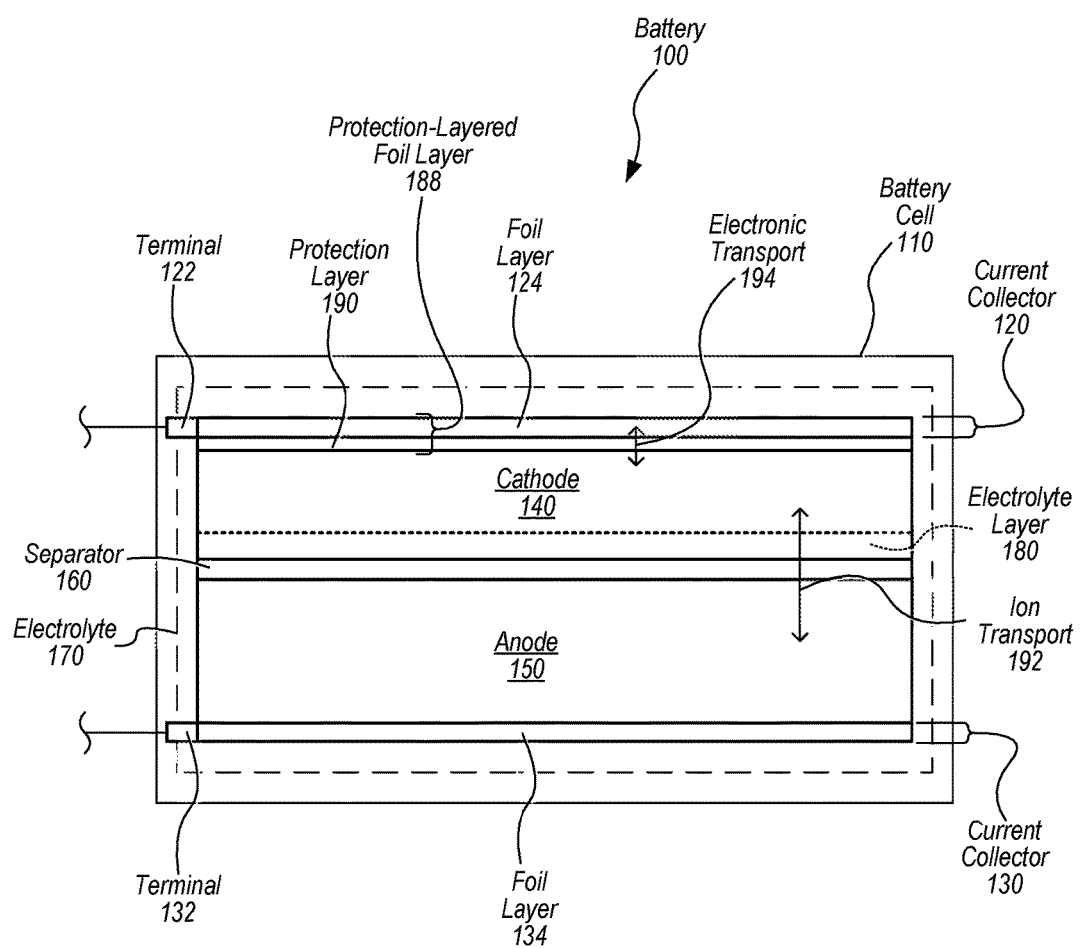
FIG. 1 illustrates a battery that comprises a protection layer, between a foil layer and an electrode, which is configured to selectively restrict electronic transport between the foil layer and the electrode in response to one or more physical conditions, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION OF EMBODIMENTS

Various embodiments of an apparatus that includes a battery configured to at least partially suppress electronic transport through one or more cells of the battery, and methods for at least partially fabricating the apparatus, are disclosed.

FIG. 1 illustrates a battery that comprises a protection layer, between a foil layer and an electrode, which is configured to selectively restrict electronic transport between the foil layer and the electrode in response to one or more physical conditions, according to some embodiments.

The battery 100 shown in FIG. 1 includes a battery cell 110 that includes an anode 150 and cathode 140 and current collectors 120-130 coupled to distal surfaces of the electrodes 140, 150 respectively, where the distal surfaces include, on each electrode of electrodes 140, 150, at least one surface which face away from the other electrode of electrodes 140, 150. The battery cell 110 may further include electrolyte positioned between the anode 150 and the cathode 140. Battery cell 110 further includes a battery separator layer 160, that separates the two electrodes, and an electrolyte 170 in which at least some of the components of the cell 110 are immersed. The electrolyte 170 can include one or more various liquid electrolytes. In some embodiments, the liquid electrolyte is included in a limited portion of the battery 100, including a limited portion of the cell. For example, the electrolyte 170 can be included in the separator 160 and not in other portions of the cell. In some embodiments, the cell includes one or more electrolyte layers 180 that are located between the electrodes. The electrolyte layer 180 can include a solid electrolyte layer. In some embodiments, the separator 160 is absent from cell 110. Specifically, although shown in FIG. 1 as having both a separator 160 with a liquid electrolyte 170 and a solid electrolyte layer 180, it should be appreciated that at least some of the battery embodiments discussed here may include a separator 160 with liquid electrolyte 170 and no solid electrolyte layer 180, at least some of the battery embodiments discussed here may include a solid electrolyte layer 180 and no separator 160 and liquid electrolyte 170, etc.

A battery cell 110 can include at least one cathode 140, anode 150, and electrolyte 170, 180, which are comprised of various materials. In some embodiments, a battery cell 110 includes a cathode 140 that is comprised of one or more various metal oxides. The battery cell 110 can include electrolytes in one or more various phases. For example, a battery 100 that includes a lithium battery can include a liquid electrolyte 170, which can include one or more various lithium salts in an organic solvent. In some embodiments, a battery 100, which can include a lithium battery, includes an electrolyte layer 180, in one or more cells 110, which includes a molten salt layer. In another example, a battery 100, which can include a lithium battery, can include one or more solid electrolyte layers 180, which can include lithium phosphorous oxynitride ("LiPON") that can be mixed with one or more various binder substances, which can include one or more of polyvinylidene fluoride (PVDF), carboxymethyl cellulose (CMC), one or more Acrylic substances, etc. A solid electrolyte can form a layer in a battery cell between the electrodes 140, 150 of the battery cell 110. In some embodiments, a battery cell 110 includes at least one liquid electrolyte and at least one solid electrolyte.

In some embodiments, battery cell 110 includes a separator 160 that comprises an at least partially permeable structure which permits the transport of at least some charge carriers, including one or more ions, between the electrodes 140, 150 of the cell 110. In some embodiments, the battery cell 110 is a lithium ion battery cell that comprises a separator 160, which permits the transport 192 of lithium ions between the electrodes 140, 150 of the cell 110. In some embodiments, the separator 160 includes one or more pores via which one or more charge carriers can pass. In some embodiments, the separator comprises a polymer separator. In some embodiments, the separator 160 is configured to inhibit the charge carrier transport between the electrodes based at least in part upon a temperature to which the separator 160 is exposed. Exposure of a component, including one or more layers, of a battery cell to one or more conditions can include the component having that condition; for example, exposure of the separator 160 to a particular temperature can be referred to as at least one portion of the separator 160 being at the particular temperature, the particular temperature being the temperature of the separator 160, etc. A separator 160 can be referred to as a "shutdown separator", because, by forming an impermeable structure and inhibiting ion transport 192 based on temperature, the separator 160 is configured to shut down the battery cell 110 in response to the battery temperature exceeding a certain temperature. As a result, in addition to keeping the electrodes separated, the separator 160 mitigates safety hazards associated with operation of the battery 100. Such a configuration can be associated with the physical structure and composition of the separator. For example, a shutdown separator can be at least partially comprised of one or more polymer materials, including polyethylene, which can melt in response to the local temperature exceeding a threshold, where the melted material coats one or more portions of the separator with a nonconductive layer that inhibits charge carrier transport across the separator, and thus inhibits charge carrier transport between the electrodes.

In some embodiments, a battery 100 comprises a lithium battery 100 that is independent of any battery separator 160. For example, battery cell 110 can include an electrolyte layer 180 that can include a layer including a solid electrolyte material and does not include a separator 160 between the electrodes 140, 150. In some embodiments, battery cell 110 includes a liquid electrolyte 170 that is included within one or more other portions of the battery, including one or more electrodes, such that the liquid electrolyte 170 enables ion transport 192 between a solid electrolyte layer 180 and one or more other portions of the battery. For example, where layer 180 is a solid electrolyte layer, cathode 140 can comprise a porous structure in which a liquid electrolyte 170 is included, where the liquid electrolyte 170 can enable ion transport 192 between the solid electrolyte layer 180 and the cathode 140.

In some embodiments, the anode 150 of one or more battery cells 110 is comprised of one or more materials that include lithium metal. For example, the anode 150 can be comprised entirely of lithium metal.

Current collectors 120, 130 shown in FIG. 1 each include an electric terminal 122, 132 and a foil layer 124, 134, which is physically connected to the respective terminal of the current collector and is coupled to a surface of a separate electrode layer in the cell. Each foil layer 124, 134 enables uniform electronic transport between the electrode layer and the foil layer. A foil layer can be comprised of one or more various materials, and separate foil layers in a battery cell can be comprised of different materials. For example, a foil layer can be comprised of one or more of aluminum, copper, nickel, iron, tin, titanium, any other known metallic composition of foil layers in a battery cell, etc. In some embodiments, a foil layer comprises one or more of a laminated material, an alloy material, etc.

A foil layer can facilitate electron transport, also referred to herein as electronic transport 194, between an electrode and an electric terminal. A foil layer can extend over some or all of a surface of an electrode, thereby enabling an increased uniformity in electronic transport across the surface of the electrode. For example, foil layer 124 in FIG. 1 extends over a surface of cathode 140 and facilitates electronic transport between the cathode 140 and the terminal 122 of the current collector 120. The foil layer 124, as noted above, is comprised of a conductive material, including one or more metallic substances, which conducts electrical power between the cathode 140 and the terminal 122.

In some embodiments, a foil layer, to be "coupled" to an electrode layer, is applied to the electrode layer. Applying a layer can be referred to herein interchangeably as adhering a layer, and one or more substances can be applied to a foil layer to facilitate adhesion of a foil layer to an applied electrode layer. For example, a given surface of a foil layer can be coated with a layer of carbon black and applied to an electrode layer, where the carbon black material augments adhesion of the foil layer to the electrode layer.

In some embodiments coupling a foil layer, to an electrode layer includes application of the electrode layer to the foil layer, such that the foil layer is a substrate upon which at least a portion of the electrode layer is applied. Applying a layer can be referred to herein interchangeably as adhering a layer, and one or more substances can be applied to a foil layer to facilitate adhesion of a foil layer to an applied electrode layer. For example, a given surface of a foil layer can be coated with a layer of carbon black and an electrode layer can be applied to the carbon black layer, where the carbon black material augments adhesion of the foil layer to the electrode layer.

In some embodiments, a battery cell includes a particular layer, applied to a foil layer, which at least partially restricts electronic transport through one or more battery cells in based on exposure to one or more physical conditions within at least the particular layer. Such a layer is referred to herein as a "protection layer", and a foil layer and one or more protection layers applied thereto is referred to collectively as a protection-layered foil layer. As referred to herein, a "protection layer" can be referred to interchangeably as a "functional layer", a "protection layer material" comprised in the protection layer can be referred to as a "functional layer material", and a "protection material" included in the protection layer can be referred to as a "functional material". A battery cell can include one or more protection-layered foil layers, where the protection-layered foil layer comprises at least one protection layer that is configured to restrict electronic transport between at least a portion of the foil layer included therein with a separate portion of the battery cell, thereby restricting operation (e.g., charging, discharging) of the battery cell under certain conditions.

As shown in FIG. 1, cell 110 includes a protection-layered foil layer 188, applied to the cathode 140, which includes foil layer 124 and a protection layer 190 between the foil layer 124 and the protection layer 190. The protection layer 190 can provide adhesion of the foil layer 124 to the cathode 140 and can, under regular battery operating conditions, conduct electricity between the cathode 140 and foil layer 124, thereby facilitating electronic transport 194. Upon exposure to one or more particular physical conditions, the protection layer can at least partially restrict electronic transport 194 across the layer 190, thereby restricting electronic transport between cathode 140 and foil layer 124, which can result in shutting down operation of the battery cell 110.

Such a configuration of the protection layer can mitigate the effects of a failure, fault, etc. of the cell, one or more conditions that can lead to a failure, fault, etc., by shutting down the cell. In particular, the protection layer 190 can be configured to restrict electronic transport based on exposure to physical conditions that can result from one or more various failures of the battery cell. Such failures can include one or more of excessive current through the cell during charging or discharging, an electrical short, an overcharging state associated with excessive voltage, an excessive discharge state associated with an undervoltage, excessive temperature in the cell, an overheating state of the cell that is associated with one or more temperature values, an overpressure state in the cell, some combination thereof, etc. For example, the one or more conditions can include physical conditions associated with an electrical short of the battery cell, including one or more of temperature, voltage, etc. which exceeds one or more threshold values. Because the protection layer restricts electronic transport based on exposure to one or more of such physical conditions, the protection layer can shut down a battery cell that is experiencing one or more various faults. As a result, the physical effects of such a failure, fault, etc. are mitigated, thereby mitigating the risk of physical damage to elements external to the cell 110.

In some embodiments, a protection layer can conduct or restrict electronic transport across the layer, based on the physical conditions to which it is exposed, independently of the composition, phase, type, etc. of electrolytes that are present in the battery cell. For example, the protection layer 190 shown in FIG. 1 can be comprised of materials that are chemically neutral, inert, etc. with regard to the one or more electrolytes 170, 180 that can be present in the cell 110. In some embodiments, the protection layer 190 is electrochemically neutral. As a result, the protection layer 190 can provide a "shut down" ability for the battery that can be utilized without consideration for the type and composition of electrolytes included in the battery cell, as the protection layer 190 may operate, i.e., conduct or restrict electronic transport, regardless of the electrolyte materials included in the cell. The protection layer 190 can thus provide augmented shutdown capability with respect to a battery separator layer 160 as a result of operating independently of the various electrolytes that can be included in the battery cell. The protection layer can thereby provide at least partial shutdown of batteries that include solid electrolyte materials. In addition, as discussed further below, the protection layer can restrict electronic transport between separate battery cells and can provide at least partial shutdown, electrical isolation, etc. between separate battery cells in a battery. The protection layer can thereby provide at least partial shutdown of bipolar batteries, as discussed further below.

In some embodiments, the protection layer provides augmented adhesion between a foil layer and one or more other layers included in the battery, reduced contact resistance between the foil layer and one or more other layers included in the battery, etc. The protection layer can be comprised of a mixture of various materials, referred to herein as the protection layer material, where at least some of the protection layer material comprises materials that provide various functions of the protection layer. The protection layer material can include one or more binder materials that provide adhesion by the protection layer between the foil layer and another portion of the battery to which the protection-layered foil layer is applied. A binder material can include one or more of CMC, PVDF, Acrylic binders, some combination thereof, etc. The protection layer material can include one or more conductive materials, also referred to herein as active materials, which are electrically conductive and therefore at least partially facilitate electronic transport across the protection layer. Conductive materials can include one or more of carbon black materials, carbon nanotube materials, silver materials, etc. The protection layer material can include one or more thermally-activated binder materials that are activated based on the temperature of the binder materials exceeding one or more threshold temperatures.

In some embodiments, a protection layer, to restrict electronic transport across the layer based on exposure of the layer to one or more physical conditions, changes from being an electrically conductive layer to being an electrically insulating layer based on exposure to the one or more physical conditions. Physical conditions can include one or more of a temperature of at least the protection layer, a voltage of at least the protection layer, some combination thereof, etc. For example, a protection layer can change to an electrically insulating layer, thereby shutting down a battery cell, in response to exposure of at least a portion of the layer to a temperature that exceeds one or more threshold temperature values, which can include one or more of a high temperature threshold, a low temperature threshold, some combination thereof, etc. Exposure of at least one portion of a protection layer to a physical condition that comprises at least a particular temperature can include exposure of the at least one portion of the protection layer to a physical condition that causes the temperature of the at least one portion of the protection layer to be at least the particular temperature. Exposure of at least one portion of a protection layer to a physical condition that comprises at least a particular temperature can include the temperature of the at least one portion of the protection layer being at least the particular temperature. Exposure of at least one portion of a protection layer to a physical condition that comprises at least a particular voltage can include exposure of the at least one portion of the protection layer to a physical condition that causes the voltage across the at least one portion of the protection layer to be at least the particular voltage. Exposure of at least one portion of a protection layer to a physical condition that comprises at least a particular voltage can include the voltage across the at least one portion of the protection layer being at least the particular voltage.

To change from being electrically conductive to being electrically insulating, the protection layer can be comprised of one or more materials that, in response to exposure to one or more particular physical conditions, including one or more physical conditions that exceed one or more threshold values, change state to an electrically insulating state. Such materials are referred to herein as "protection materials". A protection material, upon changing state to an electrically insulating state, can overcome conductivity of one or more active materials included in the protection layer, thereby rendering the protection layer as an electrically insulating layer. The change in state can be irreversible, such that the battery cell is permanently shut down. In some embodiments, the change in state is reversible, such that the battery cell can be re-started upon physical conditions to which the protection layer is exposed being within one or more threshold value ranges.

A change of state of a protection material in the protection layer can include a change in molecular structure of the material within the layer, including polymerization of the material, depolymerization, decomposition, some combination thereof, etc. A change of state of a material in the protection layer can include a change in phase of the material within the layer including the material changing from a solid to a gas phase. A change of state of a material can include a combination of a change in molecular structure and a change in phase; for example, a material can, based on a local temperature of the material, decompose into one or more different substances that are in a different phase, which can result in outgassing from the material within the layer. Where a material changes molecular structure, composition, phase, some combination thereof, etc., the resulting one or more materials, in the one or more resulting phases, can be electrically insulating and can, in some embodiments, overcome one or more electrically conductive materials in the protection layer such that the protection layer becomes electrically insulating. Such overcoming of conductive materials can include the resulting one or more insulating materials terminating some or all electrically conductive pathways through the protection layer.

In some embodiments, a protection layer comprises various protection materials that each change to an electrically insulating state in response to different physical conditions. A protection layer can comprise a mixture of multiple different materials, where one or more materials change to an electrically insulating state in response to a local temperature of the material exceeding a particular threshold value and one or more different materials change to an electrically insulating state in response to a local voltage exceeding a particular threshold value and one or more different materials change to an electrically insulating state in response to the local voltage exceeding a different particular threshold value.

For example, a protection layer can include a protection material that is stable within a certain range of exposed temperatures, including a range from −40 degrees Celsius to +80 degrees Celsius, and changes state to an electrically insulating state upon exposure to a temperature beyond that range. Such a material can include one or more various polymers, additives, some combination thereof, etc., including, for example, $Li_2CO_3$. Such a protection material can respond to exposure to a physical condition beyond a certain range or threshold value by changing state, including expanding, decomposing, generating gases, some combination thereof, etc. In some embodiments, a protection layer includes a protection material that is stable when exposed to a temperature which is below a certain threshold temperature and changes state to an electrically insulating state upon exposure to a temperature above that certain threshold temperature. In some embodiments, a protection layer includes a protection material that is stable when exposed to a temperature which is above a certain threshold temperature and changes state to an electrically insulating state upon exposure to a temperature below that certain threshold temperature.

In another example, a protection layer can include a protection material that is stable within a certain range of exposed operating voltages, including a range from 3.0 volts to 4.4 volts, and changes state to an electrically insulating state upon exposure to a voltage beyond that range. Such a material can include one or more various substances, additives, some combination thereof, etc., including, for example, Biphenyl. Such a protection material can respond to exposure to a physical condition beyond a certain range or threshold value by changing state, including expanding, decomposing, generating gases, some combination thereof, etc. In some embodiments, a protection layer includes a protection material that is stable when exposed to an operating voltage which is below a certain threshold operating voltage and changes state to an electrically insulating state upon exposure to a voltage above that certain threshold operating voltage. In some embodiments, a protection layer includes a protection material that is stable when exposed to an operating voltage which is above a certain threshold operating voltage and changes state to an electrically insulating state upon exposure to a voltage below that certain threshold operating voltage.

A protection layer can comprise a mixture of various protection materials, some of which are configured to change to an electrically insulating state based on exposure to different sets of one or more physical conditions. Protection materials that change to an electrically insulating state in response to one or more physical conditions can be included in one or more "additive" materials that can be included in the mixture of materials comprising the protection layer material. In some embodiments, the additive materials comprise a minority portion of the mixture of materials comprising the protection layer material. For example, a protection layer can be comprised of a mixture of one or more additive materials, where each additive material comprises approximately 5-10% of the mixture by one or more of mass, volume, etc. In another example, a protection layer can be comprised of a mixture of one or more additive materials that collectively comprise approximately 5-10% of the mixture by one or more of mass, volume, etc. In another example, a protection layer can be comprised of a mixture of one or more additive materials, where each additive material comprises approximately 5-10% of the mixture by one or more of mass, volume, etc., one or more binder materials that comprise approximately 5-10% of the mixture by one or more of mass, volume, etc., and mixture of one or more active materials that comprise a remainder of the mixture by one or more of mass, volume, etc. In some embodiments, the protection layer comprises a slurry of various materials, including one or more active materials, protection materials, binder materials, etc. that is applied to one or more surfaces of one or more layers of a battery cell to form the protection layer.

In some embodiments, a battery cell includes one or more protection layers that are configured to be delaminated based on exposure to one or more physical conditions, substances, etc. Delamination can include delamination of a battery cell comprising a protection layer such that the protection layer is detached from one or more portions of the battery cell, delamination of the protection layer into multiple separate layers, some combination thereof, separation of the protection layer into multiple separate components, etc. Where the protection layer is located between an electrode and a foil layer, delamination can include separation of the protection layer from the electrode. As a result, delamination of the protection layer can augment recycling of a battery cell by simplifying access to one or more portions of the battery cell, including the active material comprising the electrode. Such simplification of access to various portions of the battery cell, including the active material, can result in battery recycling cost savings based on simplifying recycling of the various portions of the battery cell at the end of life of at least the battery cell, including the active material. In some embodiments, delamination of the protection layer includes at least partial dissolving of the protection layer material, which can result in simplification of recovery of one or more materials included in the protection layer, including one or more conductive materials, binder materials, protection materials, some combination thereof, etc.

The one or more physical conditions that result in delamination of the protection layer, based on exposure of the protection layer to the one or more physical conditions, can include one or more various temperatures, and the one or more protection layers can be configured to be delaminated based on exposure to a physical condition that causes a temperature of the protection layer to exceed one or more particular threshold temperature values. For example, the protection layer can be comprised of one or more materials configured to change state, such that delamination of the protection layer occurs, based on a temperature of the material exceeding one or more threshold temperature values. The one or more substances can include one or more particular substances that, when exposed to at least some of the protection layer, cause the protection layer to at least partially delaminate. For example, the one or more substances can include one or more particular solvents configured to cause at least one material included in the protection layer material to change state, including dissolving of the at least one material based on exposure to the one or more particular solvents, such that delamination of the protection layer occurs.

A change of state can include a dissolving, decomposing, phase change, some combination thereof, etc. of at least a portion of the protection layer, including at least one particular material included in the protection layer material. For example, a protection layer material can include a binder material which causes the protection layer to adhere to at least a foil layer, and a solvent can be configured to dissolve the binder material, such that the protection layer detaches from at least the foil layer. In another example, a protection layer material can include a protection material that is configured to decompose into a material that results in delamination of the protection layer based on a temperature of the protection material exceeding a certain threshold temperature value. In some embodiments, the one or more solvents are configured to cause the protection layer to detach from one or more particular materials to which the protection layer is adhered. For example, a solvent can be configured to cause a protection layer to detach from a particular active material comprising an electrode to which the protection layer is adhered, such that the protection layer is delaminated from the electrode.

Figure 2:
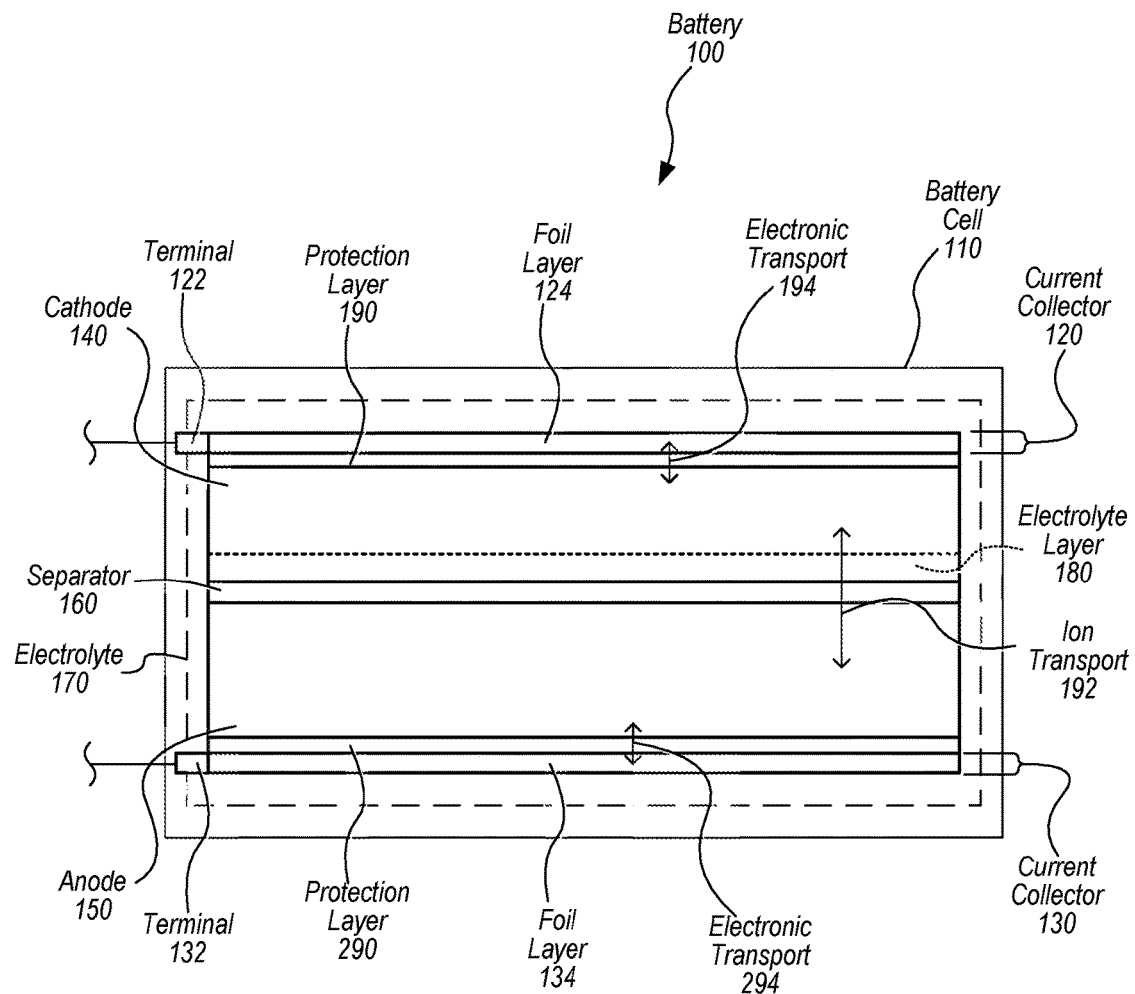
FIG. 2 illustrates a battery that comprises multiple protection layers, each located between a separate foil layer and a separate electrode, which are configured to selectively restrict electronic transport between the foil layer and the electrode under one or more physical conditions, according to some embodiments.

FIG. 2 illustrates a battery that comprises multiple protection layers, each located between a separate respective foil layer and electrode, which are configured to selectively restrict electronic transport between the foil layer and the electrode under one or more physical conditions, according to some embodiments.

In some embodiments, a battery cell can comprise multiple separate protection layers, which can be coupled, also referred to herein interchangeably as being "applied", to separate foil layers that are coupled to separate electrodes. As a result, a battery cell can include separate protection layers that are configured to restrict electronic transport between at least different foil layers and electrodes in the cell. Different protection layers included in a battery cell can be comprised of different materials and can be configured to restrict electronic transport based on exposure to different physical conditions.

In the illustrate embodiment shown in FIG. 2, for example, battery cell 110 includes, in addition to the protection layer 190 that restricts electronic transport 194 between the cathode 140 and the foil layer 124 based on exposure of the layer 190 to certain physical conditions, another protection layer 290 that is coupled to the separate foil layer 134 and is located between the foil layer 134 and the anode 150, where the different protection layer 290 is configured to restrict electronic transport 294 between the anode 150 and the foil layer 134 based on exposure of the layer 290 to certain physical conditions that can be different that the physical conditions that result in layer 190 restricting electronic transport 194.

In some embodiments, layers 190, 290 are configured to restrict electronic transport through the battery cell 110 based on exposure to a common physical condition. As a result, the multiple protection layers 190 can provide redundant electronic transport mitigation for the common physical condition, as failure by one layer 190 to fully restrict electronic transport through the cell 110 can be at least partially mitigated by another layer 290 restricting electronic transport through the cell 110. Where multiple layers 190, 290 do not, individually, fully restrict electronic transport across the individual respective layers, the multiple layers can collectively restrict electronic transport through the cell 110 to a greater level than the individual layers.

FIG. 3A-D illustrate various configurations of protection layers coupled to one or more various configurations of foil layers, according to some embodiments. The protection-layered foil layers shown in FIG. 3A-B can be included in any of the foil layers, current collectors, some combination thereof, etc. included in any of the embodiments included herein.

Figure 3A:
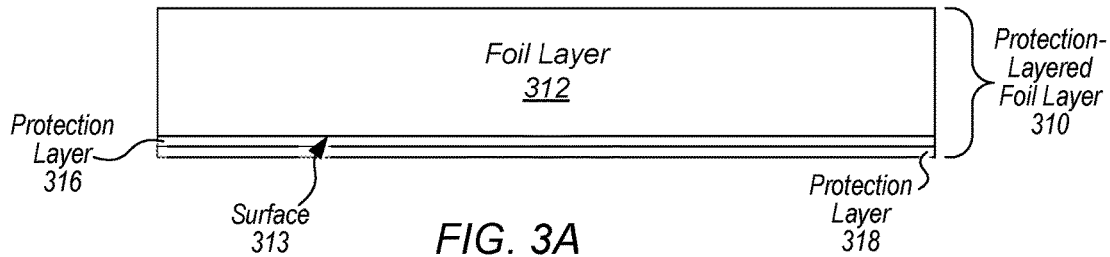
FIG. 3A-D illustrate various configurations of protection layers coupled to one or more various configurations of foil layers, according to some embodiments.
Figure 3B:
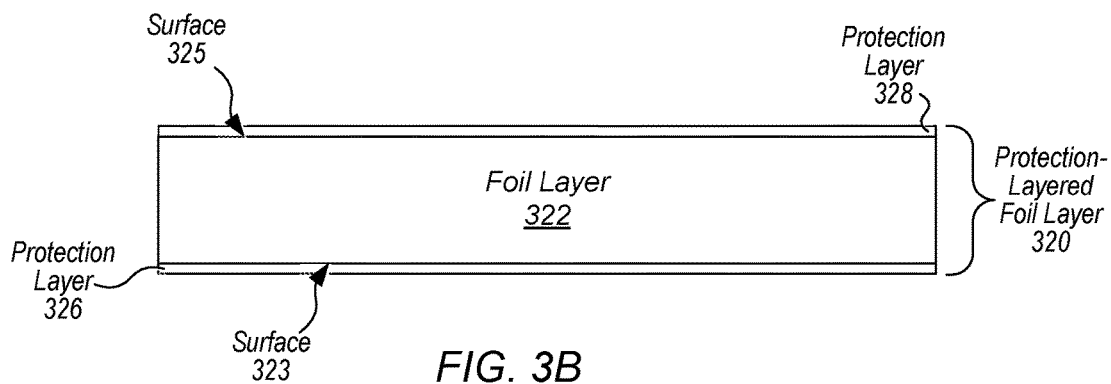

In some embodiments, a protection-layered foil layer can include one or more various configurations of foil layers and protection layers. A foil layer can include multiple different protection layers, which can be configured to change state to an electrically insulating state based on being exposed to different physical conditions. For example, FIG. 3A illustrates a protection-layered foil layer 310 that includes two different protection layers 316, 318 applied to a common foil layer 312. The two protection layers 316, 318 are applied to a common surface 313 of the foil layer 312. As shown, one or more protection layers 318 can be applied to another separate protection layer 318 that is applied to the foil layer 312. The different layers 316, 318 can comprise a different mixture of materials, including different protection materials that are configured to change to an electrically insulating state based on exposure to different physical conditions, so that the different protection layers are configured to at least partially restrict electronic transport across layer 310 based on the layer 310 being exposed to different physical conditions. For example, layer 316 can comprise a protection material, including $Li_2CO_3$, which is configured to change state to an electrically insulating state in response to exposure to a physical condition that causes a temperature of the protection material to exceed one or more threshold temperatures. In another example, layer 318 can comprise a different protection material, including Biphenyl, which is configured to change state to an electrically insulating state in response to exposure to a voltage that exceeds one or more threshold voltages.

In some embodiments, a protection-layered foil layer includes multiple protection layers that are applied to multiple separate surfaces of the foil layer included therein. For example, in the illustrated embodiment of FIG. 3B, protection-layered foil layer 320 includes a protection layer 328 that is applied to a surface 325 of foil layer 322 that is opposite from surface 323 of layer 322 to which a different protection layer 326, which can be comprised of a different mixture of materials than layer 328, is applied.

Figure 3C:
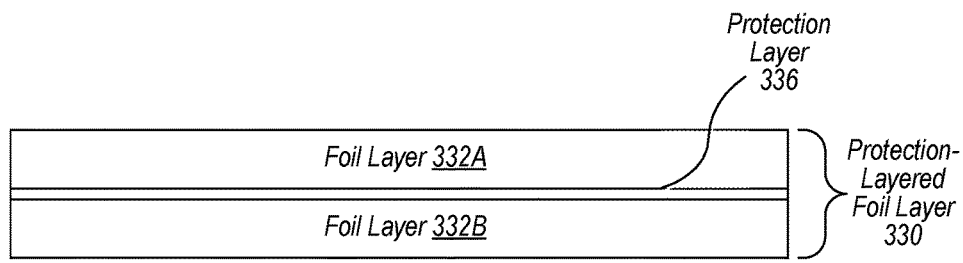

In some embodiments, a protection-layered foil layer can include one or more protection layers that are located between two or more separate foil layers, so that the protection layers can restrict electronic transport between the foil layers based on exposure of at least the one or more protection layers to one or more particular physical conditions. For example, FIG. 3C illustrates a protection-layered foil layer 330 that includes two separate foil layers 332A-B and at least one protection layer 336 located between the two layers 332A-B. In some embodiments, multiple protection layers, which can each be comprised of different mixtures of materials, can be located between the foil layers 332A-B. In some embodiments, the separate foil layers 332A-B can be comprised of different materials.

Figure 3D:
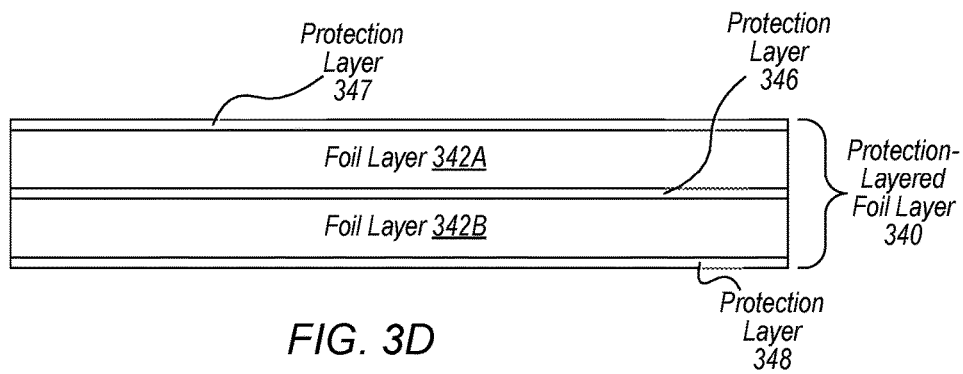

In some embodiments, a protection-layered foil layer can include one or more protection layers that are located between two or more separate foil layers and one or more protection layers that is applied to a surface of one or more of the protection layers that are applied to one or more surfaces of the foil layers that comprise one or more exterior surfaces of the protection-layered foil layer, so that one or more protection layers can restrict electronic transport between the foil layers based on exposure of at least the one or more protection layers to one or more particular physical conditions and one or more protection layers can restrict electronic transport between the protection-layered foil layer and elements that are external to the protection-layered foil layer. For example, FIG. 3D illustrates a protection-layered foil layer 340 that includes two separate foil layers 342A-B and at least one protection layer 346 located between the two layers 342A-B, and separate protection layers 347, 348 applied to exterior surfaces of the layer 340 that are distal surfaces of the separate foil layers 342A-B. In some embodiments, the separate foil layers 342A-B can be comprised of different materials. In some embodiments, the various protection layers 346-348 are comprised of separate mixtures of materials, so that different protection layers 346-348 are configured to change to an electrically insulating state, therefore restricting electronic transport through the layer 340, based on exposure to different physical conditions. Such various compositions of the various layers 346-348 can be based at least in part upon the composition of materials to which the layers are coupled. For example, layer 347 can be configured to be coupled to an electrode having a particular composition and being exposed to a particular electrolyte substance, where the protection layer 347 is comprised of a particular mixture of materials that is electrically inert with respect to that particular electrolyte substance and electrode composition.

Figure 4:
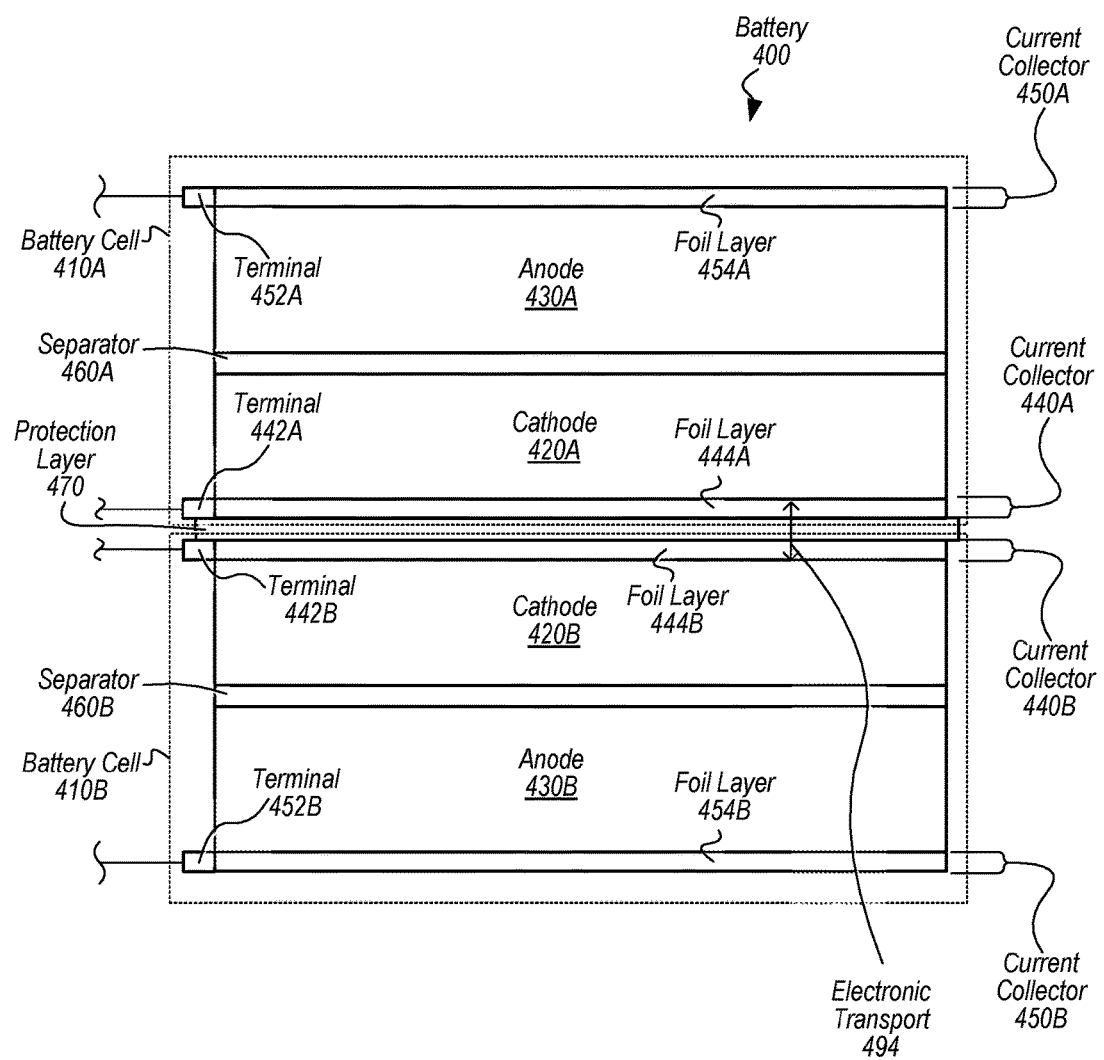
FIG. 4 illustrates a battery that includes a symmetrical configuration of multiple battery cells divided by a protection layer which lies between separate foil layers, according to some embodiments.

FIG. 4 illustrates a battery 400 that includes a symmetrical configuration of multiple battery cells divided by a protection layer that lies between separate foil layers, according to some embodiments.

In some embodiments, a battery includes multiple battery cells, where the cells are arranged in a "symmetrical" configuration where adjacent cells are arranged so that common electrodes of the separate cells are adjacent. For example, in the illustrated embodiment of FIG. 4, battery 400 includes a symmetrical configuration of cells 410A-B, where cathodes 420A-B of the adjacent cells 410A-B are adjacent.

As shown, each cell 410 includes a separate set of anodes 430A-B, cathodes 420A-B, and current collectors 440A-B and 450A-B coupled to the respective cathodes and anodes of the respective cell 410A-B. The illustrated cells 410A-B further include separator layers 460A-B between the cathode and anode in the respective cells. It will be understood that, in some embodiments, the separator 460 is absent from one or more cells 410. It will further be understood that, in some embodiments, a cell 410 includes one or more electrolyte layers between the cathode and anode of the respective cell, which can include one or more solid electrolyte layers. Separate cells in a battery can include different electrolytes, including different liquid electrolyte materials, different solid electrolyte materials, some combination thereof, etc.

As shown, each current collector 440-450 included in the cells 410A-B includes at least one foil layer 444A-B, 454A-B and at least one terminal 442A-B, 452A-B. One or more current collectors 440-450 included in the battery 400 can include any of the embodiments of protection layers included herein.

As further shown in FIG. 4, the battery 400 includes a protection layer 470 located between the proximate foil layers 444A-B of adjacent battery cells 410A-B. In some embodiments, one or more of terminals 442A-B are absent, so that electronic transport across protection layer 470 facilitates discharging, charging, etc. of one or more cells 410A-B via a terminal included in a current collector of another adjacent cell 410A-B.

In some embodiments, the protection layer 470 comprises a mixture of one or more protection materials, as described above, which are configured to change to an electrically insulating state based on at least some of the protection layer 470 being exposed to one or more physical conditions, which can include physical conditions that exceed one or more physical condition thresholds. As a result, the protection layer 470 can, based on at least the layer 470 being exposed to one or more particular physical conditions, restrict electronic transport 494 through the layer 470, which can result in restricting electronic transport between cells 410A-B. Such restricting of electronic transport can result in electrical isolation of one or more battery cells 410 in battery 400 from other cells, a shutting down of discharging, charging, etc. of one or more cells 410, some combination thereof, etc., which can mitigate a catastrophic failure of one or more battery cells that could result in physical damage to an exterior environment that is external to the battery 400. Furthermore, electrically isolating a faulty cell 410, failure of which results in the one or more physical conditions at the layer 470, can enable at least a portion of the battery 400 to continue to operate without being permanently damaged by the faulty cell.

Figure 5:
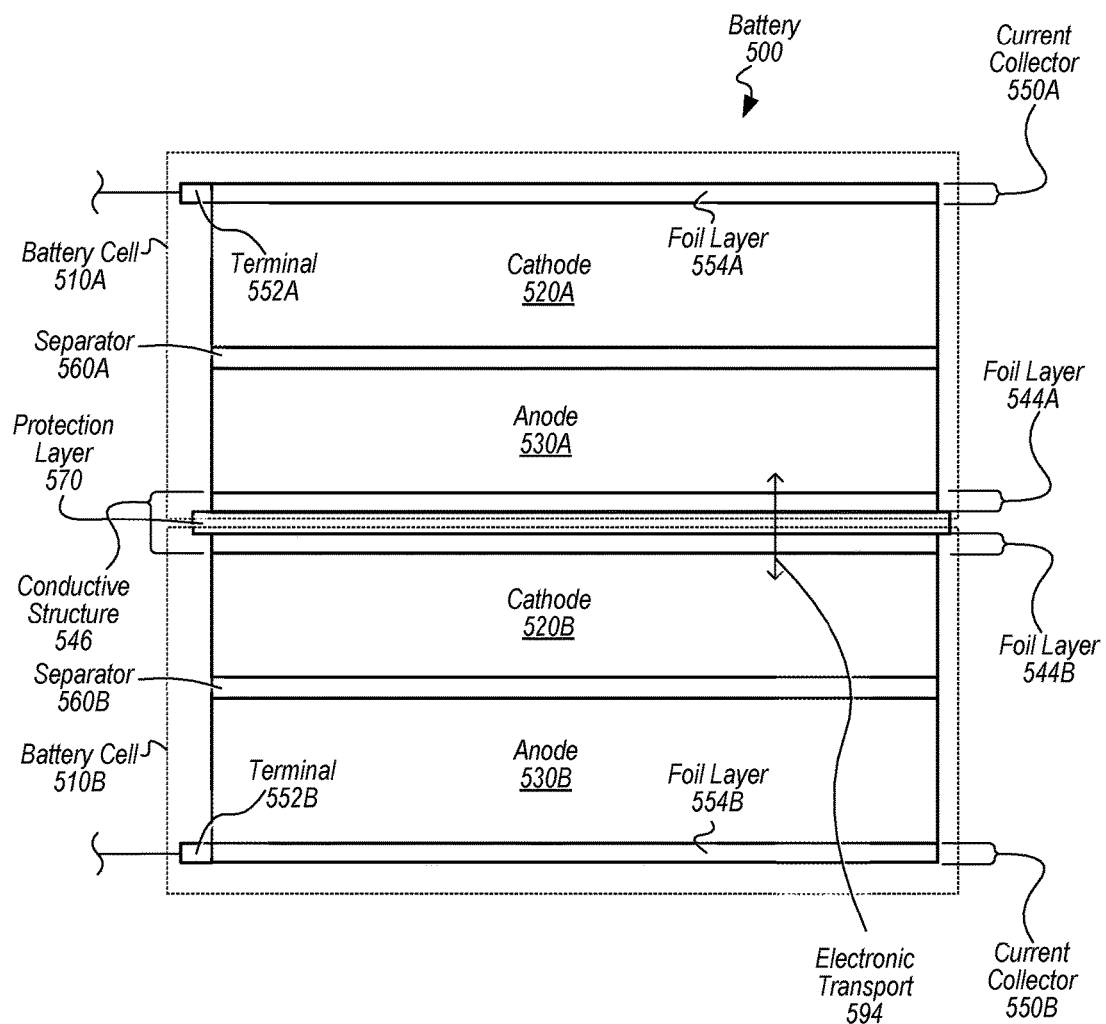
FIG. 5 illustrates a battery that includes a bipolar configuration of multiple battery cells divided by a protection layer that lies between separate foil layers, according to some embodiments.

FIG. 5 illustrates a battery 500 that includes a bipolar configuration of multiple battery cells divided by a protection layer that lies between separate foil layers, according to some embodiments.

A bipolar battery can include multiple battery cells that are stacked in a configuration where a cathode of one cell is adjacent to an anode of an adjacent cell, which can result in adjacent cells sharing an electrode structure so that one side of the electrode structure is an anode of one cell and another side of the electrode structure is a cathode of the adjacent cell. In some embodiments, the electrode structure includes one or more conductive structures, which can include one or more foil layers, between the anode and cathode sides of the structure that can facilitate electronic transport between the anodes and cathodes included in the electrode structures.

In some embodiments, a conductive structure included in an electrode structure includes a protection layer that is located between the cathode and the anode of the electrodes structure, where the protection layer is coupled to at least one surface of a foil layer included in the conductive structure of the electrode structure and is configured to at least partially restrict electronic transport across the protection layer based on the protection layer being exposed to one or more physical conditions. As a result, the protection layer can restrict electronic transport through the electrode structure, and thus between cells in a bipolar battery, based on the one or more physical conditions, which can thereby mitigate the physical consequences of a battery failure that can result from, or be the cause of, the one or more physical conditions. The one or more protection layers included in the bipolar battery can include any of the protection layers included in any of the embodiments herein.

FIG. 5 illustrates a battery 500 that includes a bipolar configuration of cells 510A-B, where each cell includes at least a cathode 520A-B and an anode 530A-B. In some embodiments, including the embodiment shown in FIG. 5, a battery cell in battery 500 includes a separator layer 560A-B between the cathode and anode in the cell. In some embodiments, one or more cells includes one or more electrolyte layers, which can include one or more solid electrolyte layers, between the cathode and anode in the cell. In addition, the distal ends of the bipolar configuration of cells 510A-B include current collectors 550A-B that include a foil layer 554A-B and terminal 552A-B. It will be understood that, in some embodiments, one or more of the current collectors 550A-B includes one or more protection layers.

As shown in FIG. 5, the cathode 520B and anode 530A of the adjacent cells 510A-B are adjacent and separated by a conductive structure 546 that is configured to enable electronic transport 594 between the cathode 520B and anode 530A of the adjacent cells 510A-B, thereby enabling electronic transport through the battery 500 between terminals 552A-B. The conductive structure 546 includes foil layers 544A-B coupled to respective ones of the anode 530A and the cathode 520B and a protection layer 570 located between the foil layers 544A-B.

In some embodiments, the protection layer 570 comprises a mixture of one or more protection materials, as described above, which are configured to change to an electrically insulating state based on at least some of the protection layer 570 being exposed to one or more physical conditions, which can include physical conditions that exceed one or more physical condition thresholds. As a result, the protection layer 570 can, based on at least the layer 570 being exposed to one or more particular physical conditions, restrict electronic transport 594 through the layer 570, and therefore the conductive structure 546, which results in restricting electronic transport between cells 510A and therefore through battery 500. Such restricting of electronic transport can result in a shutting down of discharging, charging, etc. of the battery 500, which can mitigate a catastrophic failure of the battery that could result in physical damage to an exterior environment that is external to the battery 500.

Those skilled in the art will appreciate that a number of techniques may be used to fabricate a battery, which can include a lithium battery, which includes at least one protection-layered foil layer. In some embodiments, a battery that is configured to at least partially suppress electronic transport through one or more battery cells based on one or more physical conditions at a protection layer in the cells can be at least partially fabricated via various techniques. One or more various processes for fabrication of a protection-layered foil layer can be implemented to form the protection-layered foil layer, as shown and described below.

Figure 6:
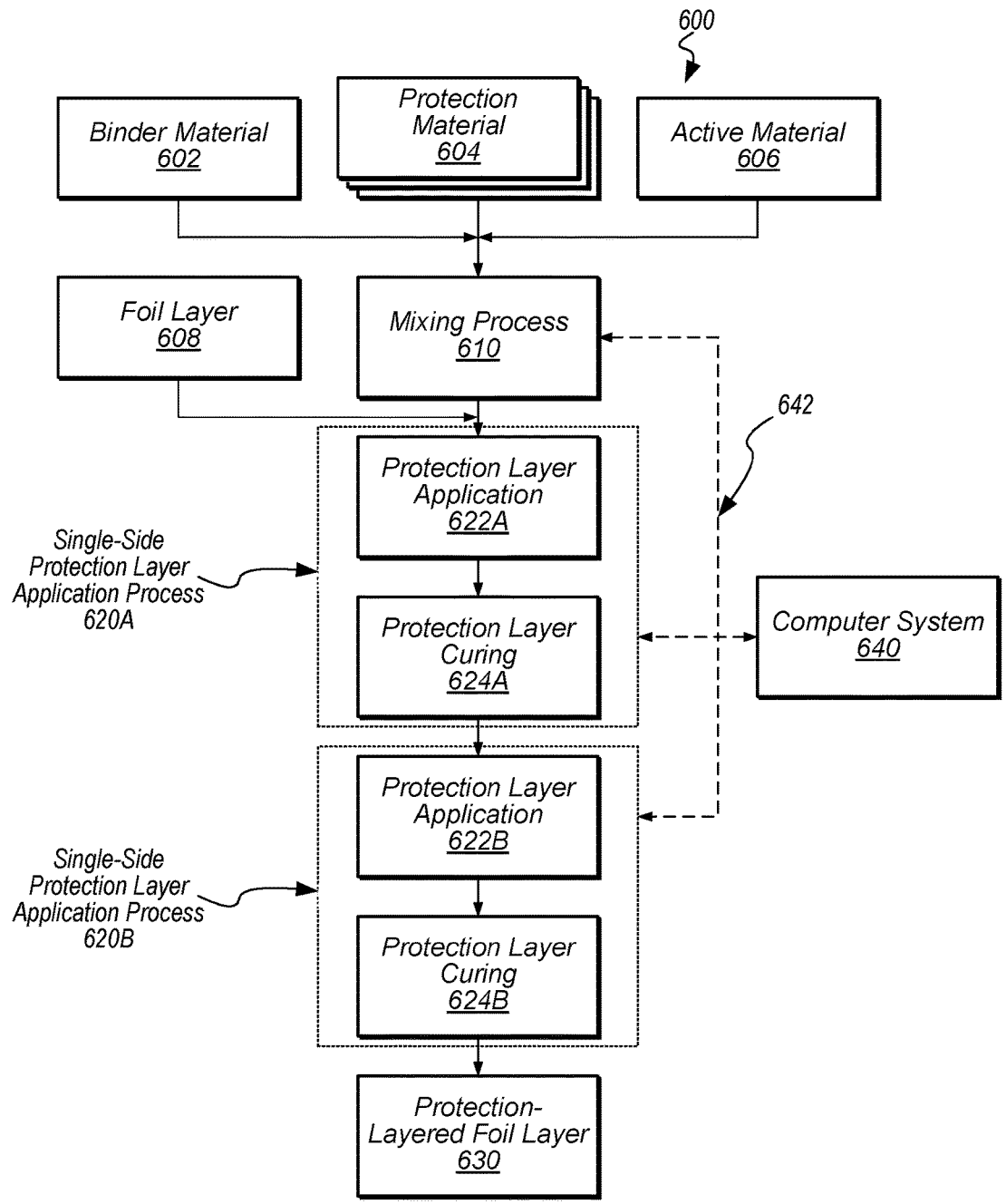
FIG. 6 illustrates a fabrication system configured to fabricate a protection layer coupled to a foil layer, according to some embodiments.

FIG. 6 illustrates a fabrication system 600 configured to fabricate a protection layer coupled to a foil layer, also referred to as a protection-layered foil layer, according to some embodiments. The fabricating can be controlled by one or more computer systems, which are described further below.

The system 600 includes a mixing process 610 where various materials 602-606 are received and mixed to form a protection layer material that is applied to one or more surfaces of a foil layer 608, via one or more processes 620A-B, to form a protection-layered foil layer 630. The protection layer material formed in process 610 can include a mixture of a particular selection of the materials 602-606 received at the process 610. The mixture can include a slurry mixture that is formed via a slurry mixing process comprised within process 610. In some embodiments, the layer 630 can include multiple protection layers, and some protection layers included in layer 630 can include separate protection layers that are comprised of different materials 602-606 and are configured to respond differently to different physical conditions. Processes 610-620 can be controlled by one or more computer systems 640 via one or more communication links 642. In some embodiments, separate processes 610-620 are controlled by separate computer systems 640 via separate communication links 642.

In some embodiments, one or more sets of materials 602-606 used to form one or more components of the protection-layered foil layer of a battery are provided to mixing process 610 as material stock, including a power stock, liquid stock, gaseous stock. At least some of the material can be provided as bulk material that is mixed, in separate amounts, in process 610 to form one or more batches of protection layer material that is provided, in one or more processes 620, to form one or more protection layers on one or more surfaces of one or more foil layers 608.

As shown, the materials 602-606 provided to the mixing process 610 can include one or more active materials 606, also referred to as conductive materials, which can facilitate electronic transport, one or more binder materials 602, and one or more protection materials 604 that are configured to change state based at least in part upon the materials 604 being exposed to one or more physical conditions. Multiple different protection materials 604 can be received, and one or more of the received materials 604 can be mixed together, in process 610, to form a protection layer material that can be provided to processes 620 to form a protection layer that can restrict electronic transport based on the layer being exposed to one or more different physical conditions. For example, one material 604 that is received can include a material, including $Li_2CO_3$ that changes state to an electrically-insulating state in response to being exposed to a physical condition, including a heat input, that causes a temperature of the material to exceed one or more thresholds, including a temperature that is beyond a particular range or "window" of temperature values. In another example, one material 604 that is received can include a material, including Biphenyl, which changes state to an electrically-insulating state in response to being exposed to a voltage that exceeds one or more thresholds, including a voltage that is beyond a particular range or "window" of voltage values. The above materials 604, in some embodiments, can be mixed together in process 610 to form a mixture that, when applied in processes 620 to form one or more protection layers, form one or more protection layers that can at least partially restrict electronic transport across the layer in response to one or more of temperature or voltage within, across, etc. the one or more protection layers exceeding one or more threshold values. In some embodiments, the separate materials 604 can be mixed into separate mixtures that are provided to processes to form different protection layers; for example, $Li_2CO_3$ can be mixed into a first mixture that is provided to process 620A to form a first protection layer and Biphenyl can be mixed into a second mixture that is provided to process 620B to form a second protection layer.

In some embodiments, one or more protection layer materials formed at process 610 are provided to one or more protection layer application processes 620 to form one or more protection layers on one or more surfaces of one or more foil layers 608 to form one or more protection-layered foil layers 630. Such application processes can result in a layer 630 that includes multiple protection layers that are applied to different surface of the foil layer, multiple protection layers applied in sequence to one or more particular surfaces of the foil layer, some combination thereof, etc. As a result, the multiple protection layers can be applied separately in separate application processes. As shown in FIG. 6, system 600 can include multiple separate protection layer application processes 620A-B where multiple separate protection layers are applied to one or more foil layers 608. In the illustrated embodiment, each application process 620 includes applying one or more protection layers to a single side, or surface, of a given foil layer 608, where separate application processes 620A-B result in application of one or more protection layers to different sides or surfaces of a foil layer. As shown, each application process 620 includes application 622A-B of a protection layer on a surface of a foil layer 608 and curing 624A-B of the applied protection layer.

The application and curing processes described herein, in both FIG. 6 and FIG. 7 below can include one or more various application and curing processes. For example, the application process can include coating a surface of a foil layer that at least one protection layer material to form a protection layer on the surface of the foil layer. The coating can be implemented via one or more various known coating processes, including slot die coating, gravure coating, dip type coating, etc. In some embodiments, the application process can include applying a protection layer to a surface of a foil layer as a particular pattern of protection layer material on the surface. In some embodiments, applying the protection layer material to a foil layer surface can include one or more of depositing the protection layer material over at least a particular selected portion of the foil layer surface, laminating the protection layer over at least a particular selected portion of the foil layer surface, etc. In another example, the curing process can include a baking process where the protection layer material applied to the foil layer surface is heated to cure the applied layer. Such curing can result in adhesion of the applied layer to the foil layer.

Figure 7:
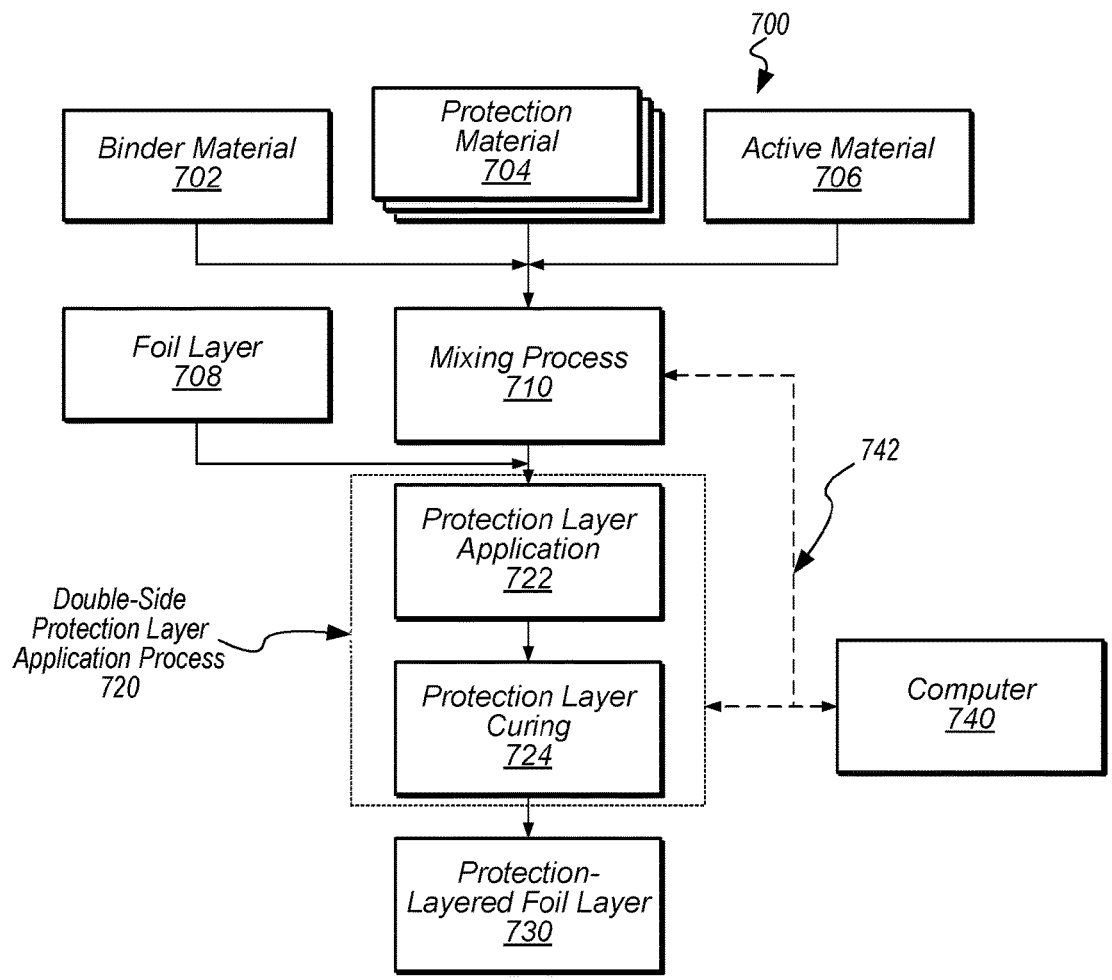
FIG. 7 illustrates a fabrication system configured to fabricate a protection layer coupled to a foil layer, according to some embodiments.

FIG. 7 illustrates a fabrication system configured to fabricate a protection layer coupled to a foil layer, also referred to as a protection-layered foil layer, according to some embodiments. The fabricating can be controlled by one or more computer systems, which are described further below.

The system 700 includes a mixing process 710 where various materials 702-706 are received and mixed to form a protection layer material that is applied multiple surfaces of a foil layer 708, via process 720, to form a protection-layered foil layer 730. The protection layer material formed in process 710 can include a mixture of a particular selection of the materials 702-706 received at the process 710. The mixture can include a slurry mixture that is formed via a slurry mixing process comprised within process 710. In some embodiments, the layer 730 can include multiple protection layers, and some protection layers included in layer 730 can include separate protection layers that are comprised of different materials 702-706 and are configured to respond differently to different physical conditions. Processes 710-720 can be controlled by one or more computer systems 740 via one or more communication links 742. In some embodiments, separate processes 710-720 are controlled by separate computer systems 740 via separate communication links 742.

In some embodiments, one or more sets of materials 702-706 used to form one or more components of the protection-layered foil layer of a battery are provided to mixing process 710 as material stock, including a power stock, liquid stock, gaseous stock. At least some of the material can be provided as bulk material that is mixed, in separate amounts, in process 710 to form one or more batches of protection layer material that is provided, in one or more processes 720, to form one or more protection layers on one or more surfaces of one or more foil layers 708.

As shown, the materials 702-706 provided to the mixing process 710 can include one or more active materials 706, also referred to as conductive materials, which can facilitate electronic transport, one or more binder materials 702, and one or more protection materials 704 that are configured to change state based at least in part upon the materials 704 being exposed to one or more physical conditions. Multiple different protection materials 704 can be received, and one or more of the received materials 704 can be mixed together, in process 710, to form a protection layer material that can be provided to processes 720 to form a protection layer that can restrict electronic transport based on the layer being exposed to one or more different physical conditions. For example, one material 704 that is received can include a material, including $Li_2CO_3$ that changes state to an electrically-insulating state in response to being exposed to a physical condition that causes a temperature of the material to exceed one or more thresholds, including a temperature that is beyond a particular range or "window" of temperature values. In another example, one material 704 that is received can include a material, including Biphenyl, which changes state to an electrically-insulating state in response to being exposed to a voltage that exceeds one or more thresholds, including a voltage that is beyond a particular range or "window" of voltage values. The above materials 704, in some embodiments, can be mixed together in process 710 to form a mixture that, when applied in processes 720 to form one or more protection layers, form one or more protection layers that can at least partially restrict electronic transport across the layer in response to one or more of temperature or voltage within, across, etc. the one or more protection layers exceeding one or more threshold values. In some embodiments, the separate materials 704 can be mixed into separate mixtures that are provided to processes to form different protection layers; for example, $Li_2CO_3$ can be mixed into a first mixture that is provided to process 720 to form a first protection layer and Biphenyl can be mixed into a second mixture that is provided to process 720 to form a second protection layer.

In some embodiments, one or more protection layer materials formed at process 710 are provided to protection layer application process 720 to form one or more protection layers on one or more surfaces of one or more foil layers 708 to form one or more protection-layered foil layers 730. Such application processes can result in a layer 730 that includes multiple protection layers that are applied to different surface of the foil layer, multiple protection layers applied in sequence to one or more particular surfaces of the foil layer, some combination thereof, etc. As a result, the multiple protection layers can be applied separately in separate application processes. As shown in FIG. 7, process 700 can include multiple separate protection layer application processes 720 where multiple separate protection layers are applied to multiple surfaces of one or more foil layers 708. In the illustrated embodiment, each application process 720 includes applying one or more protection layers to multiple sides, or surfaces, of a given foil layer 708, where separate application processes 720 result in application of multiple protection layers to multiple different sides or surfaces of a foil layer. As shown, each application process 720 includes application 722 of protection layers on multiple surfaces of a foil layer 708 and curing 724 of the applied protection layers.

Figure 8:
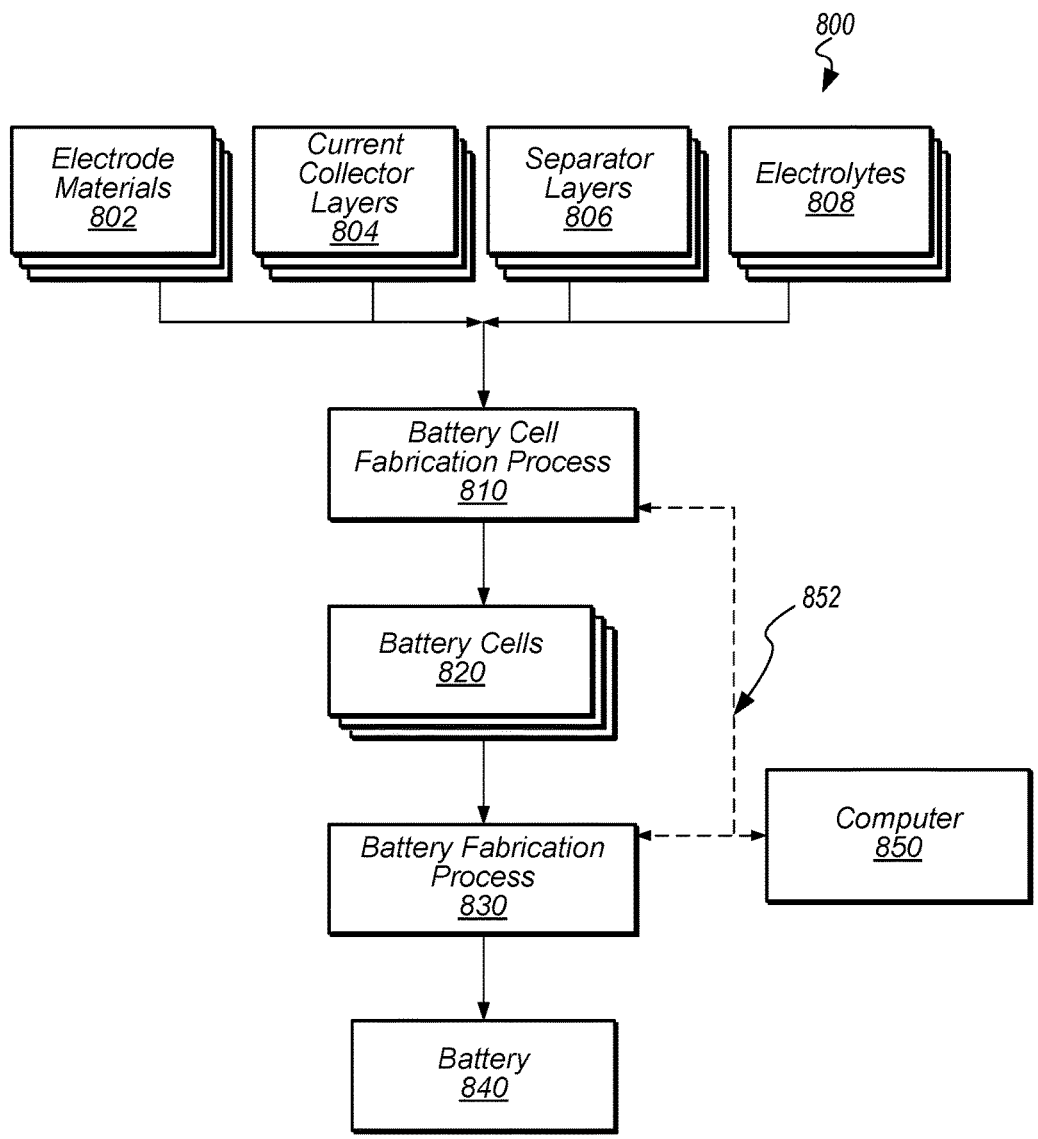
FIG. 8 illustrates a fabrication system configured to fabricate a battery, according to some embodiments.

FIG. 8 illustrates a fabrication system 800 configured to fabricate a battery, according to some embodiments. The fabricating can be controlled by one or more computer systems, which are described further below.

As shown, a set of battery components 802-808 are received into a battery cell fabrication processed, where the components are assembled to form one or more battery cells 820. As shown in FIG. 8, battery components can include one or more battery electrode layers 802, including one or more cathodes, anodes, etc. Battery components can also include one or more current collector layers 804, battery separator layers 806, and electrolyte materials 808. In some embodiments, one or more of the current collector layers 804 comprises a foil layer coupled to a terminal. In some embodiments, one or more of the current collector layers comprises a protection-layered foil layer that includes one or more various protection layers coupled to one or more portions of one or more foil layers included in the protection-layered foil layer. The protection-layered foil layer can include one or more of the layers 630, 730 fabricated in the processes shown in FIG. 6 and FIG. 7. The electrolyte materials 808 can include one or more of a solid electrolyte layer, a liquid electrolyte material, some combination thereof, etc. It will be understood that various other materials can be received into the battery cell fabrication process 810.

In some embodiments, one or more of the battery components is received as a complete layer that can be applied, in the process 810, to at least partially assemble a battery cell via stacking the complete layer onto another layer. For example, the current collectors 804 can be received as complete current collector layers, each comprising a particular amount of protection-layered foil layer coupled to a terminal, which can be applied to an electrode layer, including a cathode layer, which is received as an electrode material 802, such that process 810 does not include forming the separate electrode layer and current collector. In some embodiments, one or more of the battery components 802-808 are obtained as a set of material that can be used to form one or more layers of the battery as part of process 810. For example, one or more of the electrode materials 802 can be received as a roll of layer material that can be cut, segmented, partitioned, etc. as part of the fabrication process 810 to form an individual electrode layer for an individual battery cell. In another example, the electrolyte material 808 of an electrolyte layer, including LiPON, one or more additional materials, including PVDF binders, CMC binders, Acrylic binders, etc., can be obtained as a mass of material stock that can be applied to one or more surfaces, which can include a surface of one or more other layers of the battery cell, as described further below, to form one or more electrolyte layers. In some embodiments, obtaining the electrode materials 802 includes obtaining an anode material that is used to form one or more anodes of the battery, where the anode material comprises lithium metal.

As shown in FIG. 8, the battery cell fabrication process 810, which can be controlled by computer 850 via a communication link 852, produces one or more battery cells 820 as an output, based on fabricating the cells 820 from the components 802-808 received into the process 810. As further shown, the one or more cells 820 can be received into a battery fabrication process 830, which can be controlled by one or more computers 850 via one or more communication links 852 and that fabricates a battery 840 from at least the battery cells 820. For example, process 830 can include assembling separate battery cells 820 into a symmetrical configuration of the cells 820 to form a battery, including the symmetrical configuration shown in FIG. 4. In some embodiments, process 830 includes one or more protection layers as an input into the process, where the fabrication of the battery includes applying a protection layer to a foil layer of at least one battery cell 820 and coupling the battery cell to another battery cell, so that the protection layer lies between foil layers of the separate cells. In some embodiments, the fabrication process 830 produces a bipolar battery 840, including the battery shown in FIG. 5.

Processes 810 and 830, in some embodiments, are controlled by separate computers 850 via separate communication links 852. The battery provided from process 830 can include a battery that includes one or more protection layers, so that the battery is configured to suppress electronic transport through at least a portion of the battery based on one or more physical conditions, including one or more physical conditions that exceed one or more threshold values, at the one or more protection layers.

Figure 9:
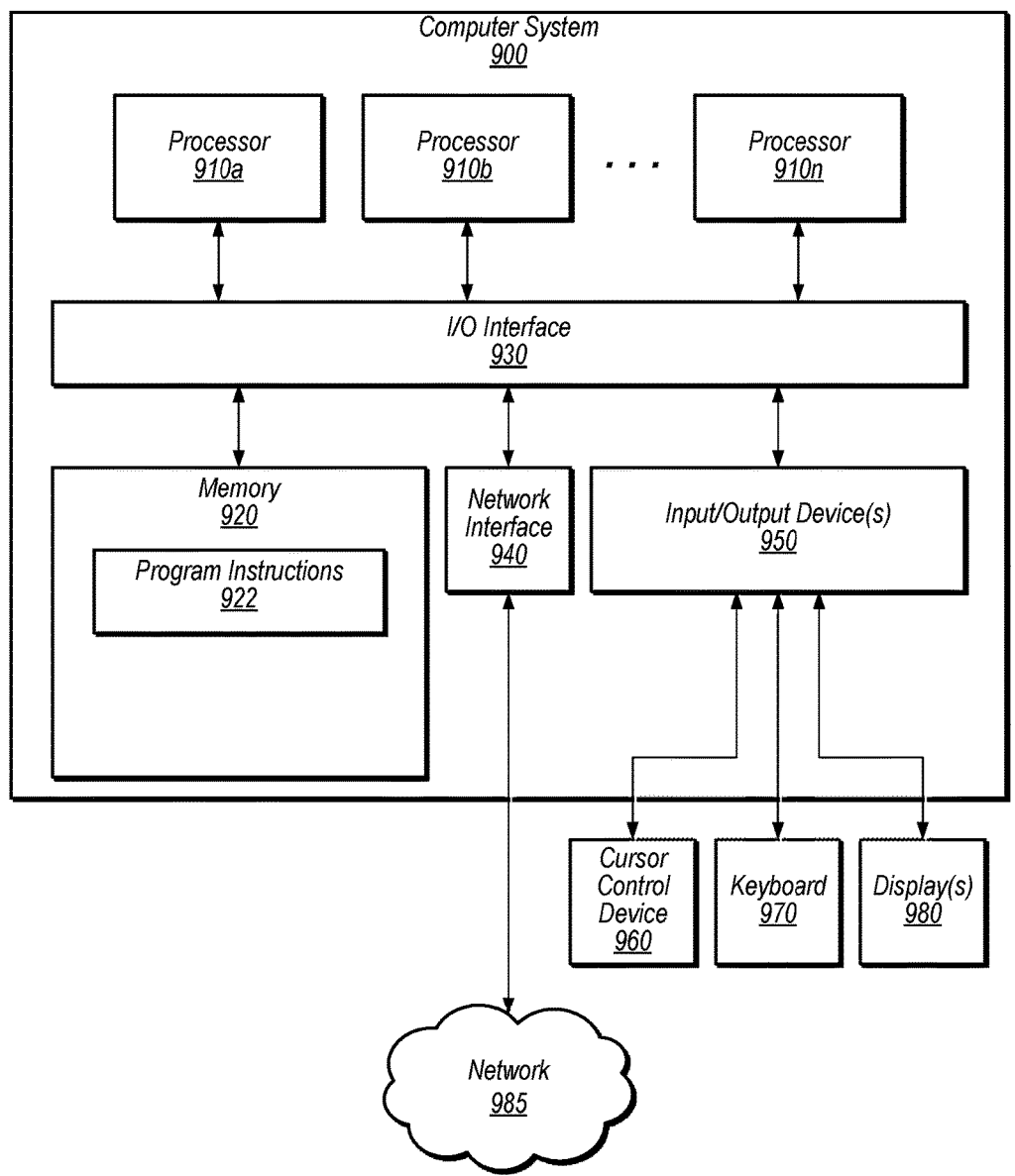
FIG. 9 illustrates an example computer system that may be configured to include or execute any or all of the embodiments described above.

FIG. 9 illustrates an example computer system 900 that may be configured to include or execute any or all of the embodiments described above. In some embodiments, computer system 900 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device in which any of the embodiments of a battery are included therein.

Various embodiments of one or more protection components of an electronic device, a process for fabricating a lithium battery, etc., as described herein, may be executed in one or more computer systems 900, which may interact with various other devices. Note that any component, action, or functionality described above with respect to FIG. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store camera control program instructions 922 and/or voice communication control data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement a point-to-point voice communication application incorporating any of the functionality described above. Additionally, program instructions 922 of memory 920 may include any of the information or data structures described above. In some embodiments, program instructions and/or data may be received, sent or stored upon different types of computer-accessible media or on similar media separate from system memory 920 or computer system 900. While computer system 900 is described as implementing the functionality of protection blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or nonvolatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A battery, comprising:
    an electrical terminal;
    a first foil layer positioned between a first electrode of the battery and the electrical terminal of the battery;
    a first protection layer applied to a first surface of the first foil layer and configured to, in response to exposure of the first protection layer to one or more particular physical conditions, at least partially inhibit electrical transmission within the battery; and
    a second protection layer applied to a second surface of the first foil layer and configured to, in response to exposure of the second protection layer to one or more particular physical conditions, at least partially inhibit electrical transmission within the battery.

2. The battery of claim 1, further comprising a third protection layer positioned between a second electrode and a second foil layer.

3. The battery of claim 1, further comprising a third protection layer, the third protection layer positioned on a surface of the first protection layer opposite the first foil layer.

4. The battery of claim 1, further comprising a second foil layer, the second foil layer positioned between the first protection layer and the first electrode.

5. The battery of claim 4, further comprising:
    a third protection layer, the third protection layer positioned between the first foil layer and the electrical terminal; and
    a fourth protection layer, the fourth protection layer positioned between the second foil layer and the first electrode.

6. The battery of claim 1, wherein the first foil layer is positioned between a first cell of the battery and a second cell of the battery.

7. The battery of claim 1, wherein the first protection layer at least partially inhibits electrical transmission by one or more of the following:
    delamination;
    changing state,
    changing molecular structure; and
    generating gases.

8. The battery of claim 7, wherein changing state comprises one or more of the following:
    the first protection layer changing phase;
    the first protection layer at least partially decomposing;
    the first protection layer at least partially expanding.

9. The battery of claim 7, wherein changing molecular structure comprises one or more of the following:
    the first protection layer at least partially decomposing;
    the first protection layer at least partially polymerizing; and
    the first protection layer at least partially depolymerizing.

10. The battery of claim 7, wherein delaminating comprises one or more of the following:
    the first protection layer physically detaching from one or more portions of the battery;
    the first protection layer separating into two or more separate layers; and
    the first protection layer separating into two or more separate components.

11. The battery of claim 1, wherein:
    the one or more particular physical conditions comprise one or more of:
        a temperature condition;
        a voltage condition;
        a current condition; and
        a pressure condition; wherein
    the first protection layer at least partially inhibits electrical transmission when the one or more particular physical conditions reach one or more predefined thresholds.

12. The battery of claim 1, wherein:
    the one or more physical conditions include an electrical short; and
    the first protection layer at least partially inhibits electrical transmission when the protection layer is subjected to the electrical short.

13. A method, comprising:
    at least partially fabricating a battery, the at least partially fabricating the battery comprising:
        fabricating a first protection layer, the first protection layer configured to at least partially restrict electronic transport within the battery in response to exposure of the battery to one or more particular physical conditions, the fabricating the first protection layer comprising:
            mixing two or more materials to form a first protection layer material;
            applying the first protection layer material to a first surface of a first foil layer of the battery;
            curing the first protection layer material;
        fabricating a second protection layer, the second protection layer configured to at least partially restrict electronic transport within the battery in response to exposure of the battery to one or more physical conditions, the fabricating the second protection layer comprising:
            mixing two or more materials to form a second protection layer material;
            applying the second protection layer material to a second surface of the first foil layer of the battery; and
            curing the second protection layer material.

14. The method of claim 13, wherein the first protection layer comprises two or more separate layers, the two or more separate layers comprising disparate compositions of materials.

15. The method of claim 13, further comprising:
    fabricating a third protection layer, the third protection layer configured to at least partially restrict electronic transport within the battery in response to exposure of the battery to one or more physical conditions, the fabricating the third protection layer comprising:
  mixing two or more materials to form a third protection layer material;
  applying the third protection layer material to a second foil layer of the battery; and
  curing the third protection layer material.

16. The method of claim 13, wherein the fabricating the first protection layer is controlled by a computer system via a communication link.

17. A portable electronic device comprising:
  at least one functional component that is configured to consume electrical power; and
  a battery that is configured to provide electrical power support to the at least one functional component, wherein:
    the battery is configured to at least partially shut down based on at least partial exposure to one or more particular physical conditions; and
    the battery comprises a plurality of protection layers located between two or more portions of the battery, the plurality of protection layers respectively configured to at least partially restrict electronic transport between the two or more portions of the battery based on the at least partial exposure to the one or more particular physical conditions, wherein a first protection layer of the plurality of protection layers is applied to a first surface of a foil layer of the battery a second protection layer of the plurality of protection layers is applied to a second surface of the foil layer.

18. The portable electronic device of claim 17, wherein one or more of the plurality of protection layers at least partially restricts electronic transport between the two or more portions of the battery by the one or more protection layers changing from being substantially electrically conductive to being at least partially electrically insulating in response to exposure of the one or more protection layers to the one or more particular physical conditions.

19. The portable electronic device of claim 17, wherein the plurality of protection layers comprises a third protection layer positioned on a surface of the first protection layer opposite the foil layer.

20. The battery of claim 1, wherein the first and second protection layers respectively comprise disparate first and second protection layer materials.

* * * * *